April 14, 1970 R. GOTTSCHALD 3,506,289
BELLOWS PACKINGS FOR UNIVERSALLY MOVABLE
JOINTS, ESPECIALLY FOR BALL JOINTS
Filed Dec. 2, 1966
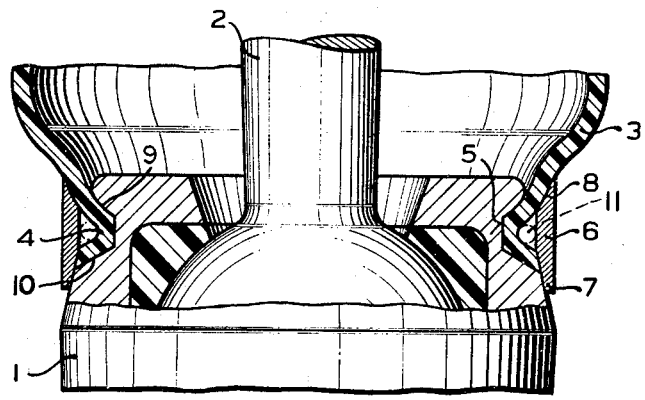
INVENTOR
RUDOLF GOTTSCHALD
BY Arthur Schwartz
ATTORNEY 3,506,289
BELLOWS PACKINGS FOR UNIVERSALLY MOVABLE JOINTS, ESPECIALLY FOR BALL JOINTS
Rudolf Gottschald, Osterath, am Meerbusch, Germany, assignor to A. Ehrenreich & Cie., Dusseldorf-Oberkassel, Germany
Filed Dec. 2, 1966, Ser. No. 598,789
Int. Cl. F16c 11/06
U.S. Cl. 287—87                    1 Claim

ABSTRACT OF THE DISCLOSURE

A ball joint having a sealing bellows positioned within a groove in the joint housing, a ring holding the bellows in place, together with an annular strap with inclined edges.

---

The present invention relates to a bellows packing for the opening where the joint pin leaves the joint case in universally movable joints and more particularly in ball joints the joint case of which has an exterior peripheral groove on the side of the passage opening for the joint pin for securing the bellows packing to said joint case, the rim of the bellows packing engaging into said groove.

With the bellows packings of the above type which are already known the bellows rim engaging into the peripheral groove of the joint case is exposed to outside influences which may destroy the same and render the desired tight attachment questionable. In addition, dirt and dust accumulation may occur at the exterior engaging joint of the bellows rim in the peripheral groove which, as the ball joint moves, may result in a detrimental grinding effect at this point.

It is primarily the object of the present invention to remedy said unfavorable effects.

According to the present invention the rim of the bellows engaging into the peripheral groove of the joint case is surrounded by an annular strap one rim of said strap projecting against the joint case until contacting the same and the other rim of said strap projecting against the bellows wall until contacting the latter.

The annular strap may consist of any suitable material such as plastics, especially having elastic properties, but even of metal. It protects the bellows rim engaging into the peripheral groove of the joint case and ensures engagement of the same into the peripheral groove.

The annular strap may be fixed without any tension ring to be provided for drawing the rim of the bellows into the peripheral groove of the joint case. It will, however, also be possible to provide the bellows rim, in addition to the annular strap, with a normal tension ring which then is covered by the annular strap.

The drawing is an example of a construction according to the present invention showing a vertical section of a bellows packing attached to a joint case.

The ball joint and the bellows packing have only been shown to such an extent as will be necessary for a better understanding of the present invention.

The joint case of which only a part has been shown has been identified by 1. The joint pin has been indicated by 2. 3 is the elastic bellows packing.

In the embodiment of the present invention as shown in the drawing the rim of the bellows facing the joint case 1 forms a channel 4 which, on the outside, is like a U. By means of said rim the bellows packing engages into the annular peripheral groove 5 of the joint case. The annular strap 6 surrounds the engaging rim of the bellows. Said annular strap projects, by means of its rim 7, against the joint case 1 until contacting the latter. By means of the other rim 8 the annular strap projects against the bellows 3 until contacting the wall of the latter.

For improved engagement the interior rim surfaces of the annular strap are inclined as indicated in the drawing as 7 and 8. The rim 8 engages the U-shaped end portion 4 of the bellows conforming in shape with the housing and bellows. This is adjacent the upper side wall 9 of the U-shaped groove. The other inclined rim 7 engages the bellows edge and a portion of the housing 1 adjacent the lower side wall 10. It is noted that the ring 11 is positioned in the channel or U-shaped end portion 4.

I claim:
1. A ball and joint comprising:
 (a) a joint housing,
 (b) a ball within said housing,
 (c) a ball joint pin having one end attached to said ball and another end extending outwardly from said housing,
 (d) a substantially U-shaped annular groove on the outside of said housing, said groove having a lower side wall and an upper side wall each directed radially inwardly from the outside edge of said housing, said side walls connected by a base, said side walls and base thus forming the substantially U-shaped groove,
 (e) a sealing bellows having a U-shaped end portion within said groove, an edge of said U-shaped end portion terminating at substantially an outer edge of said lower side wall of said substantially U-shaped groove,
 (f) a ring positioned around said U-shaped end portion of said bellows within said groove,
 (g) a substantially flat annular strap surrounding said ring and said groove and having a pair of inclined rim edges, one of said inclined edges engaging said bellows and conforming in shape with said housing and bellows adjacent said upper side wall for pressing said bellows to said housing, the other of said inclined edges engaging said bellows edge and a portion of the housing adjacent said lower side wall, the central portion of the strap being within said U-shaped end portion of said bellows and drawing said bellows in to provide a tight seal between said bellows and said housing to prevent the intrusion of dirt, dust and the like.

References Cited

UNITED STATES PATENTS 3,208,290   9/1965   Mathues et al. _____ 287—90 X
3,269,758   8/1966   Ulderup et al. _____ 287—87

LAVERN D. GEIGER, Primary Examiner
J. S. MEDNICK, Assistant Examiner

U.S. Cl. X.R.
277—212